UNITED STATES PATENT OFFICE.

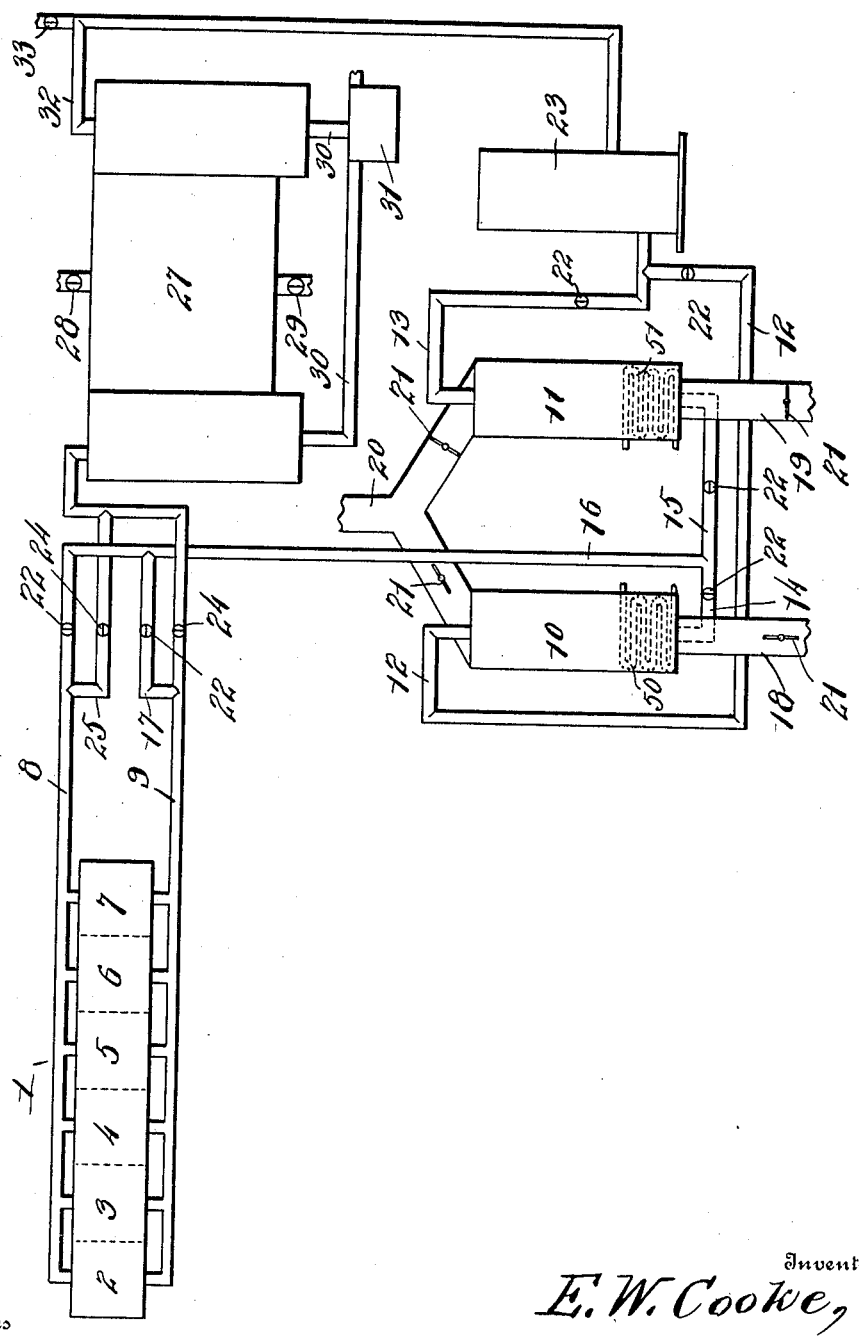

ERNEST W. COOKE, OF WAUKESHA, WISCONSIN, ASSIGNOR, BY MESNE ASSIGNMENTS, TO AMERICAN DEHYDRATING COMPANY, A CORPORATION OF WISCONSIN.

PROCESS OF DEHYDRATING ANIMAL AND VEGETABLE SUBSTANCES.

No. 871,982.     Specification of Letters Patent.     Patented Nov. 26, 1907.

Application filed December 21, 1906. Serial No. 348,968.

*To all whom it may concern:*

Be it known that I, ERNEST W. COOKE, a citizen of the United States, residing at Waukesha, in the county of Waukesha and State of Wisconsin, have invented certain new and useful Improvements in Process of Dehydrating Animal and Vegetable Substances, of which the following is a specification.

My invention relates to a process of dehydrating material, which is especially adapted to the dehydration of food substances, both animal and vegetable.

The object of my invention is to provide an improved process for the purpose stated, whereby the material treated will be perfectly dehydrated without losing any of its essential constituents or characteristics, and so that it can be restored to its original condition by the mere addition of water.

I have heretofore found that, when dried air is passed through material of the kind mentioned, a certain proportion of the volatile oils are frequently carried off by the air, and not merely the water, whereby the material loses some of its characteristics.

An essential feature of my present invention consists in passing the air in a continuous circuit through the material and condensing out the water only, whereby such volatile constituents, as may have been carried off as well, are returned to and reabsorbed by the material, whereby a greatly improved dehydrated product is obtained.

The process consists in the steps to be hereinafter described in connection with the accompanying drawing, in which I have illustrated diagrammatically and by way of example only, an arrangement of apparatus by which the process can be carried out.

In the drawing, 1 represents a dehydrating chamber, here shown as consisting of a series of compartments 2, 3, 4, 5, 6 and 7, in which the material or materials to be treated are placed, preferably on trays arranged in stacks. The construction of the dehydrating chamber, as well as of the trays or other means for holding the material therein forms no part of my present invention, and they are consequently not here shown in detail. The dehydrating chamber may consist of any number of compartments, or may be merely a tunnel, in which case the ends of the successive stacks of trays constitute partitions which prevent the air used in the process from flowing longitudinally in the tunnel.

It is immaterial as far as the process hereinafter claimed is concerned, whether the trays are moved intermittently through the chamber, or not. With the arrangement of piping and valves shown in the drawing, the chamber is simply loaded up with stacks of trays, which remain stationary during the process and may be removed from the same end at which they were put in, but my process is equally applicable to the case where the trays are intermittently fed through the chamber or tunnel, as will be apparent.

Pipes 8 and 9 are provided to convey air into and out of each compartment of the chamber and, in the form shown, each of said pipes acts alternately as an inlet pipe and as an outlet pipe, the direction of the currents of air being reversed through the sections of the chamber at intervals.

10 and 11 represent air-driers, which may be of any ordinary type, the only essential being that they contain a moisture-absorbing substance, such as calcium chlorid, for example, supported on trays or otherwise. Each drier is used alternately to heat the air and remove moisture therefrom before it is passed to the dehydrating chamber, and while one of them is thus being used, the other is being dried again in a well-known way, by passing heated air therethrough, the air being heated by the steam-coils 50 and 51 shown in dotted lines. The air which is used to dehydrate the food is passed downwardly through the driers from the pipes 12 and 13, and issues therefrom through the pipes 14 and 15 into a common pipe 16 from which it passes, either directly into the pipe 8, or through the branch pipe 17 into the pipe 9, and thence into the chamber, either at the top thereof or at the bottom, as the case may be.

The air for drying the moisture-absorbing substance in the drier which is not being used at the time comes through the pipe 18 or the pipe 19 and issues into a stack 20. When either drier is in use, the pipe 18 or 19, as the case may be, and the pipe leading to the stack 20 from that drier, are shut off by the valves 21, and the valves 22, in the pipes 12, 14 and 17, which are the pipes which convey the air to be passed through the material into and from the other drier, are opened, as will be obvious.

23 represents a blower by means of which the air is caused to pass through the driers and the dehydrating chamber.

After passing through the material in the chamber, either upwardly or downwardly, as the case may be, the air issues therefrom, either through the pipe 8 or the pipe 9 into a condenser 27. In case it is issuing through pipe 9, the valve 24 in said pipe is opened, the valve 22 in the branch pipe 17 is closed while the valve 22 in the pipe 8 is opened and the valve 24 in the branch pipe 25 is closed.

The condenser 27 is provided with inlet 28 and outlet 29 for a cooling medium, such as brine or ammonia, and with outlets 30 for the condensed water, leading to a trap 31, whereby the water can be drawn off without letting any air into the condenser.

From the condenser the air issues through pipe 32, leading to the suction side of the blower 23, thus completing the circuit. A valve 33 is provided in a branch of the pipe 32, through which from time to time, as may be necessary, additional air may be admitted into the circuit to replace such air as may be carried off with the water of condensation.

The operation briefly stated, is as follows: The dehydrating chamber being loaded with material, the blower is started and air is forced through one of the driers 10, 11, into the chamber, passing through the sections thereof either upwardly or downwardly. The other drier is meanwhile being heated preparatory to being used in its turn. After thus passing through the material, the air, carrying more or less moisture extracted from the material, passes into the condenser, where it is cooled and a part of the moisture condensed. It is impossible to remove in the condenser, as much of the moisture as is necessary for the proper dehydration of most materials, and, of course, when the air leaves the condenser, it is a very low temperature. Hence it is passed from there into a drier, either 10 or 11, where its temperature is raised to the desired degree and a further amount of moisture is extracted. It is then passed again through the material, either in the same direction or in the opposite direction. In practice the flow of the air is constant and the direction of flow through the material is reversed at intervals, the length of which depends upon the requirements of the material being treated.

While I have shown the blower 23 as located between the condenser and the driers, it may, of course, be placed at any convenient point in the circuit.

It will be apparent, when one of the driers, 10 for example, has become cooled and more or less saturated with moisture extracted from the air flowing through it on its way to the chamber, and consequently the other drier 11, which has meanwhile been heated and dried, is switched on, that the temperature of the current of air will be suddenly raised and that its temperature gradually diminishes from that time until the first drier 10 is switched on again, when the temperature is suddenly raised again, and so on. This is an important feature of my process, because these sudden increases in the temperature of the current of air flowing through the dehydrating chamber cause the material to expand and the moisture to be sucked out, while the subsequent gradual diminutions in the temperature prevent the material from being burned or dried too quickly. These variations in temperature can be regulated as required for any particular material by varying the length of time for which each drier is used in the circuit, as well as by varying the temperature imparted to the drier while it is cut out of the circuit.

Where, as sometimes occurs, the air coming into the drier contains but little more moisture than that required for the treatment of a certain material, it is impossible to raise the temperature of the air to the desired point without extracting too much moisture. Also, when the air entering the drier is of low humidity, if it were heated in said drier to the temperature required, some of the calcium carbid, where that substance is used, might be carried over with the air into the material, which would obviously be undesirable. Under these conditions therefore I make use of the steam-coil in the base of the drier, as a super-heater for the air, whereby the desired temperature can be imparted without any detrimental result. In other words, whereas ordinarily the steam-coil of the drier is shut off while that drier is in the circuit, it is left on under certain conditions in order to still further heat the air after it leaves the drier proper on its way to the dehydrating chamber.

It will now be seen that my process consists essentially in passing a current of air in a continuous circuit through the material and tempering its heat and humidity to any desired degree in that portion of the circuit outside the dehydrating chamber.

It will also be apparent why it is necessary to employ both a condenser and a drier, and, in some cases, also a super-heater.

Finally, it must be understood that the arrangement of apparatus shown in the drawing is merely illustrative of the process and that many other arrangements could be used equally as well.

Having thus described my invention, its function and result and the manner in which it is carried out, what I claim is:—

1. The process of dehydrating food substances, which consists in placing them on stationary trays in a closed chamber, passing a current of dry air through the same in one direction, removing the moisture from said air while away from said chamber and returning said air through the same substances in the chamber again but in the opposite direction.

2. The process of dehydrating food substances, which consists in placing them on stationary trays in a closed chamber, passing a current of dry air through the same in one direction for a certain period of time, removing the moisture from said air while away from said chamber, returning said air through the same substances again, and reversing the direction of flow of the air through the substances at predetermined, variable intervals.

3. The process of dehydrating food substances, which consists in passing a current of dry air upwardly through the same while in a closed chamber, removing the moisture from said air while away from said chamber and again passing the same air through the substances in the chamber but in the downward direction.

In testimony whereof I have signed my name to this specification in the presence of two subscribing witnesses.

ERNEST W. COOKE.

Witnesses:
 HOWARD A. COOMBS,
 L. L. ARMSTRONG.